UNITED STATES PATENT OFFICE.

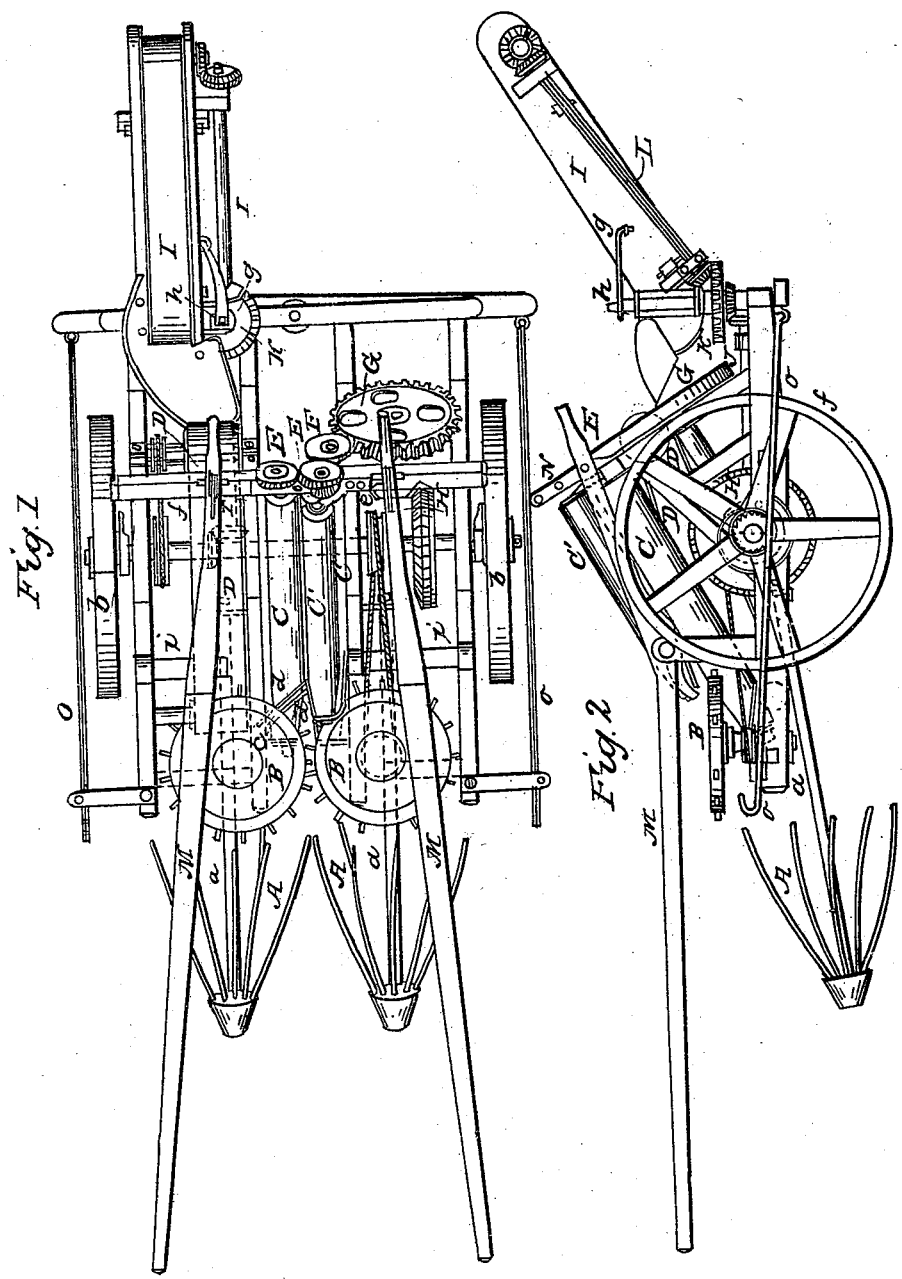

CYPRIAN U. CRANDALL, OF GALESBURG, ILLINOIS.

IMPROVEMENT IN CORN-HARVESTER.

Specification forming part of Letters Patent No. 72,811, dated December 31, 1867.

*To all whom it may concern:*

Be it known that I, CYPRIAN U. CRANDALL, of the city of Galesburg, in the county of Knox and State of Illinois, have invented a new and useful Improvement in Corn-Harvesters; and I do hereby declare that the following is a full, clear, and exact description of the construction and operation of the same, reference being had to the accompanying drawings, making a part of this specification, in which—

Figure 1 is a plan view of the machine; Fig. 2, a side elevation.

Like letters in both figures of the drawings indicate like parts.

The nature of my invention consists of the following improvements in the construction of corn-harvesters: first, the construction and arrangement of conical feelers or conveyers forward of the machine, for raising the fallen stalks to an upright position; second, arranging and combining therewith two gatherers provided with fingers or teeth, for placing the stalks in the proper position to be operated on; third, so constructing and arranging two or more smooth rollers, whereby the ears may be separated from the stalks; fourth, so applying and combining rubber or other springs with one or both ends of a roller as will enable the same to accommodate itself to the varying sizes of the stalks; fifth, arranging and combining with the rollers two or more pieces of wire or rods, for preventing the ears, after being separated from the stalks, from falling to the ground; sixth, the arrangement and combination of an endless carrier with the rollers, for receiving and conveying the ears away therefrom; seventh, the arrangement and combination of a swinging carrier with the above, for depositing the ears in a wagon or suitable box in the rear thereof; eighth, the arrangement of adjustable poles or tongues independently of each other, for preventing side draft and enabling the machine to straddle the rows of the corn.

To enable others skilled in the art to make and use my invention, I will proceed to describe its construction and operation.

A A are the feelers or conveyers, attached to rods *a a*, connecting with the frame of the machine. They are constructed of steel wire, slightly bent, so that on the forward movement of the machine they will traverse the ground properly and revolve toward each other, introducing themselves under the fallen stalks of corn and raising them to an upright position.

B B are the gatherers, provided with fingers or teeth. The left one is driven by an endless band or chain connecting it properly with the shaft of the driving-wheels *b b*; the right by the contact of its teeth with those of the other. The stalks, on being raised by the feelers or conveyers, are pressed toward the gatherers, which, as they revolve inwardly, are caught and passed between them to the rollers.

C' C C are the rollers. The two lower ones lie in the same plane, and incline downwardly (see Fig. 2) from the rear to the front, with their lower ends so tapering (see Fig. 1) as to allow the stalks to be placed between them by the gatherers, where, by their revolutions toward each other, the stalks are forced down and the ears thus necessarily separated from them and most invariably from the husks. The left-hand roller is placed higher than the right, or it may be made larger, or a roller, C', placed above the left-hand one, which will revolve by the friction of the stalks, so that in either event the ears separated therefrom will be inclined toward the carrier D and drop thereon. To make allowance for the varying sizes of the stalks, one of the rollers is made to adapt itself to any size of the same by a rubber spring, *c*, (see dotted lines in Fig. 1,) placed back of the support-plate, to which the tapering end of the roller is pivoted, said plate being secured to the side of the beam. This idea may be carried out with the other end of the roller, and with the ends of the next, if necessary. Two pieces of wire or rods, *d d*, (see Fig. 1,) or other suitable contrivance, are attached to the top of the beam, under the gatherer, and obliquely over the rollers C C, to prevent the ears from falling to the ground on their separation from the stalks. The rollers C C have pinion-wheels E E at their upper ends, the right meshing with a like one, F, below, and it meshing with a larger wheel, G, the shaft of which has a beveled one, *e*, meshing with a larger beveled wheel, H, on the shaft of the driving-wheels. This constitutes the gearing for operating the rollers, the whole being supported by suitable framing. The endless carrier D is placed in close proximity to the rollers to receive the ears therefrom, and is operated in a suitable manner by a band or chain, $f$, connecting the upper shaft of the carrier with the shaft of the driving-wheels.

I is the swinging carrier, constructed of two side pieces, between which the carrier proper is arranged to operate. It is supported by an arm, $g$, connecting it with a fixed shaft, $h$, secured to the rear transverse beam of the machine. A shaft, J, is arranged on cross-pieces of the main frame, with a small beveled cog-wheel at one end meshing with one on the shaft of the driving-wheels, at the other a similar wheel meshing with one on the fixed shaft; also, on the same shaft, and secured over the latter, is a larger one, K. A shaft, L, supported properly by projecting pieces from the side of the carrier, with a small beveled cog-wheel at one end meshing with the larger just described, and at the other a similar wheel meshing with another on the shaft of the carrier, constitutes the gearing continuously from the shaft of the driving-wheels, by which the carrier is operated. A trough or other suitable contrivance is constructed at the lower end of the carrier to receive the ears on their passage from the first carrier to this, which deposits it in a wagon or box in the rear.

M M are the poles or tongues, attached to cross-bars $i$ $i$. The ends of these bars are pivoted to upright pieces of the frame, so as to allow the poles to be depressed or elevated to operate the machine properly. To do this conveniently handles are attached to them, which, when the poles are adjusted, are secured properly by pins in holes in upright bars N N, attached to the rear of the frame. By this arrangement of the poles side draft is prevented, and the machine is enabled to straddle the rows of corn, the horses being placed on the outside of the poles and suitably hitched to the rods O O, which rods are attached to the double-tree pivoted to the center of the rear transverse beam.

Having thus fully described my invention, what I claim therein as new, and desire to secure by Letters Patent, is—

1. Constructing a corn harvester or picker with feelers or conveyers A A, for raising the fallen stalks of corn to an upright position, substantially in the manner as described.

2. The combination of the gatherers B B with the feelers or conveyers A A, substantially in the manner and for the purpose as herein described.

3. The construction and arrangement of the rollers C' C C, substantially in the manner and for the purpose as herein described.

4. The arrangement of the rubber spring $c$ with the rollers, when the rollers are constructed and arranged substantially in the manner and for the purpose as herein described.

5. The wires or rods $d$ $d$, as arranged substantially in the manner and for the purpose as herein described.

6. The arrangement of the endless carrier D with the rollers, when the rollers are constructed and arranged substantially in the manner and for the purpose as herein described.

7. Constructing a corn-harvester with a swinging carrier, I, substantially in the manner and for the purpose as herein described.

8. The adjustable tongues or poles M M, handles, upright bars N N, and rods O O, substantially in the manner and for the purpose as herein described.

9. The feelers or conveyers A A, rollers C' C C, spring $c$, wires or rods $d$ $d$, carriers D and I, and poles M M, all as arranged and combined substantially in the manner as described.

CYPRIAN U. CRANDALL.

Witnesses:
CHARLES F. CALKINS,
S. N. GROSE.